(12) United States Patent
Yi

(10) Patent No.: US 9,269,929 B2
(45) Date of Patent: Feb. 23, 2016

(54) ELECTROCHEMICAL STORAGE CELL

(75) Inventor: Jeong-Doo Yi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 492 days.

(21) Appl. No.: 13/187,392

(22) Filed: Jul. 20, 2011

(65) Prior Publication Data
US 2012/0208073 A1 Aug. 16, 2012

(30) Foreign Application Priority Data

Feb. 11, 2011 (KR) .................. 10-2011-0012461

(51) Int. Cl.
| H01M 2/06 | (2006.01) |
|---|---|
| H01M 2/22 | (2006.01) |
| H01M 2/26 | (2006.01) |
| H01M 2/30 | (2006.01) |
| H01M 4/66 | (2006.01) |
| H01M 4/74 | (2006.01) |
| H01M 10/39 | (2006.01) |
| H01M 10/36 | (2010.01) |
| H01M 2/02 | (2006.01) |

(52) U.S. Cl.
CPC ............... *H01M 2/022* (2013.01); *H01M 2/06* (2013.01); *H01M 2/22* (2013.01); *H01M 2/26* (2013.01); *H01M 2/30* (2013.01); *H01M 4/661* (2013.01); *H01M 4/663* (2013.01); *H01M 4/74* (2013.01); *H01M 10/3909* (2013.01); *H01M 10/3945* (2013.01); *H01M 10/36* (2013.01); *H01M 2300/0065* (2013.01)

(58) Field of Classification Search
CPC ........... H01M 2/06; H01M 2/22; H01M 2/26; H01M 2/30; H01M 4/661; H01M 4/663; H01M 4/74; H01M 4/368; H01M 10/3909; H01M 10/3945; H01M 10/36; H01M 2300/065

USPC .......................................... 429/101, 105, 161
See application file for complete search history.

(56) References Cited

U.S. PATENT DOCUMENTS

| 4,774,156 A | 9/1988 | Bones et al. |
|---|---|---|
| 5,143,802 A | 9/1992 | Wright |
| 5,187,029 A | 2/1993 | Coetzer et al. |
| 5,230,968 A | 7/1993 | Bones et al. |
| 5,279,908 A | 1/1994 | Bones et al. |

(Continued)

FOREIGN PATENT DOCUMENTS

| JP | 1993-006777 A | 1/1993 |
|---|---|---|
| JP | 1994-024155 B | 3/1994 |
| JP | 1994-089722 A | 3/1994 |
| JP | 7-153492 A | 6/1995 |
| JP | 07-240231 | 9/1995 |

OTHER PUBLICATIONS

Patent Abstracts of Japan, and English machine translation of Japanese Publication 07-240231 listed above, (35 pages).

*Primary Examiner* — Eugenia Wang
(74) *Attorney, Agent, or Firm* — Lewis Roca Rothgerber Christie LLP

(57) ABSTRACT

An electrochemical storage cell includes a housing; a solid electrolyte tube, which defines an inner space of the housing as a first electrode chamber and a second electrode chamber; a first electrode material in the first electrode chamber; a second electrode material in the second electrode chamber; and an electron channel unit arranged in the second electrode chamber for guiding movement of electrons in the second electrode chamber, the electron channel unit having a non-constant thickness.

9 Claims, 8 Drawing Sheets

(56) References Cited

U.S. PATENT DOCUMENTS

| | | |
|---|---|---|
| 5,472,806 A | 12/1995 | Meintjes |
| 5,476,733 A | 12/1995 | Coetzer et al. |
| 5,573,871 A * | 11/1996 | Von Benda .................. 429/103 |
| 2008/0145746 A1 | 6/2008 | Zappi et al. |

\* cited by examiner

FIG. 8A
FIG. 8B
FIG. 8C
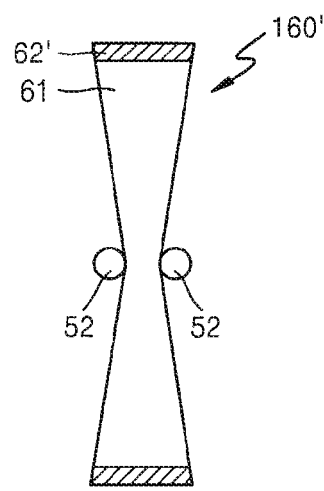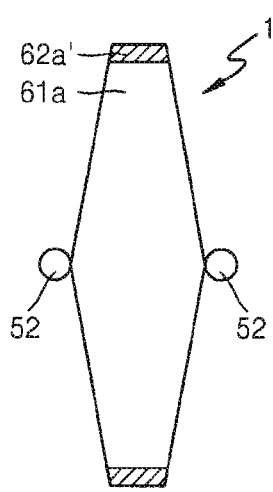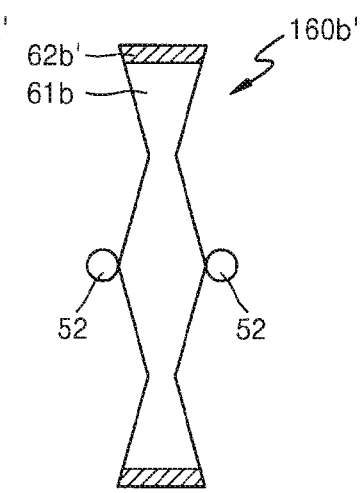
FIG. 8D
FIG. 8E
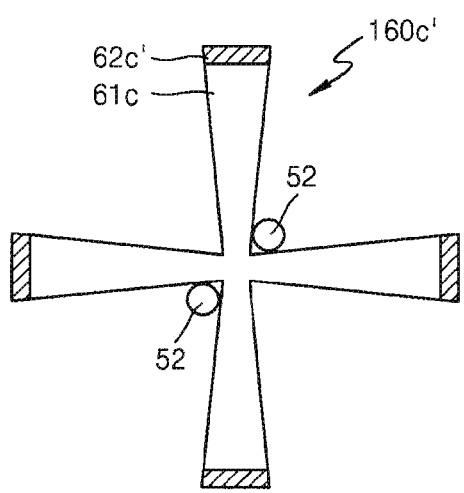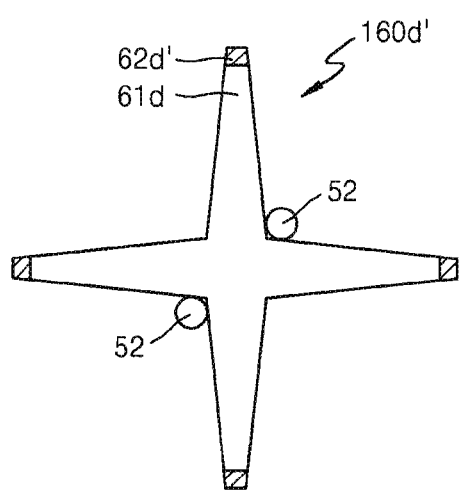

FIG. 9A  FIG. 9B  FIG. 9C
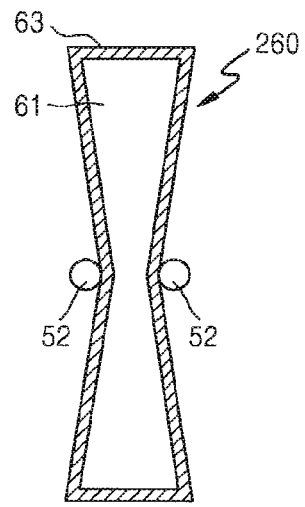 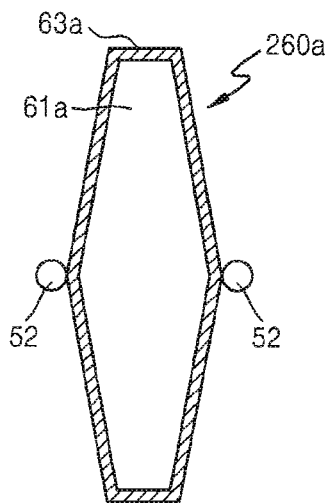 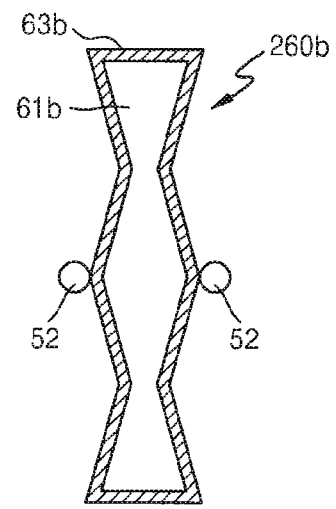
FIG. 9D  FIG. 9E
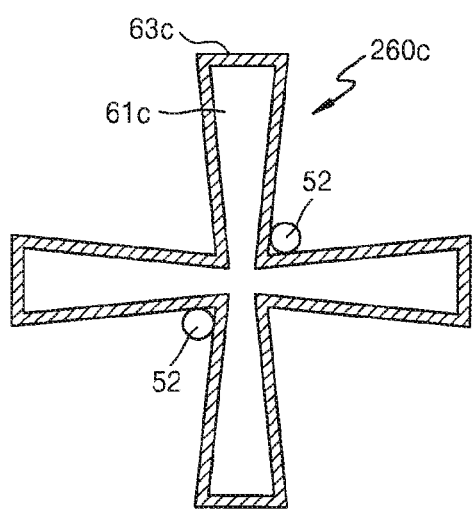 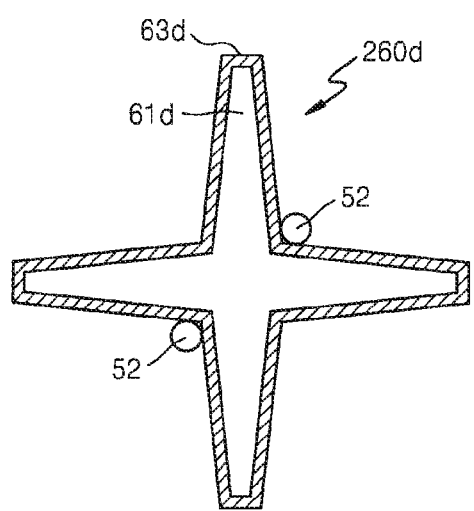

ELECTROCHEMICAL STORAGE CELL

CROSS-REFERENCE TO RELATED APPLICATION

This application claims the benefit of Korean Patent Application No. 10-2011-0012461, filed on Feb. 11, 2011 in the Korean Intellectual Property Office, the entire content of which is incorporated herein by reference.

BACKGROUND

1. Field

Aspects of embodiments of the present invention relate to an electrochemical storage cell.

2. Description of the Related Art

Research on and development of sodium-based electrochemical storage cells as devices for storing electricity produced via household power generation, solar photovoltaic power generation, wind power generation, or the like and supplying electricity to an electric vehicle, are being continuously conducted.

A sodium-based electrochemical storage cell is a large capacity battery which may store electricity from several kW to several MW, have high energy density, and have a long lifespan. Therefore, a sodium-based electrochemical storage cell may be applied to various fields.

SUMMARY

According to an aspect of embodiments of the present invention, an electrochemical storage cell is provided in which electrons may easily move.

Additional aspects of embodiments of the present invention will be set forth in part in the following description and, in part, will be apparent from the description, or may be learned by practice of the embodiments described herein.

According to one or more embodiments of the present invention, an electrochemical storage cell includes a housing; a solid electrolyte tube, which defines an inner space of the housing as a first electrode chamber and a second electrode chamber; a first electrode material in the first electrode chamber; a second electrode material in the second electrode chamber; and an electron channel unit arranged in the second electrode chamber for guiding movement of electrons in the second electrode chamber, the electron channel unit having a non-constant thickness.

The thickness of the electron channel unit may be greater at a center portion of the electron channel unit than at edges of the electron channel unit.

The thickness of the electron channel unit may gradually decrease from the center portion toward the edges.

The thickness of the electron channel unit may be greater at edges of the electron channel unit than at a center portion of the electron channel unit.

The thickness of the electron channel unit may gradually increase from the center portion toward the edges.

The thickness of the electron channel unit may decrease and increase from a center portion of the electron channel unit toward edges of the electron channel unit.

The thickness of the electron channel unit at a thickest portion of the electron channel unit may be less than twice the thickness of the electron channel unit at a thinnest portion of the electron channel unit.

The electron channel unit may be symmetrical about an axis extending through a center of the electron channel unit.

The electron channel unit may include a carbon-based material.

The electron channel unit may include a metal.

The electron channel unit may include a carbon-based felt having a thickness that is non-constant from a center of the electron channel unit toward edges of the electron channel unit; and a metal layer arranged on an outer surface of the carbon-based felt.

The electron channel unit may include carbon-based felt having a thickness that is non-constant from a center of the electron channel unit toward edges of the electron channel unit; and a metal member combined with edges of the carbon-based felt.

A cross-sectional shape of the electron channel unit may include a cross-like shape or a linear shape.

According to one or more embodiments of the present invention, an electrochemical storage cell includes a housing; a solid electrolyte tube, which defines the internal space of the housing as a first electrode chamber and a second electrode chamber that may be arranged inside the first electrode chamber; an anode material in the first electrode chamber; a cathode material in the second electrode chamber; a current collector arranged at a center portion of the second electrode chamber; and an electron channel unit supported by the current collector and having a thickness that is non-constant in a direction from a center portion thereof toward edges thereof, the electron channel unit being configured to guide movement of electrons moving in a direction from the current collector toward the solid electrolyte tube or in a direction from the solid electrolyte tube toward the current collector, inside the second electrode chamber.

The thickness of the electron channel unit may be greater at the center portion of the electron channel unit than at the edges of the electron channel unit.

The thickness of the electron channel unit may be greater at the edges of the electron channel unit than at the center portion of the electron channel unit.

The thickness of the electron channel unit may decrease and increase from the center portion of the electron channel unit toward the edges of the electron channel unit.

The thickness of the electron channel unit at a thickest portion of the electron channel unit may be less than twice the thickness of the electron channel unit at a thinnest portion of the electron channel unit.

The electron channel unit may include a carbon-based material.

The electron channel unit may include a carbon-based felt having a non-constant thickness from the center portion of the electron channel unit to the edges of the electron channel unit; and a metal layer arranged on an outer surface of the carbon-based felt.

The electron channel unit may include a carbon-based felt having a non-constant thickness from the center portion of the electron channel unit to the edges of the electron channel unit; and a metal member combined with the edges of the carbon-based felt.

The edges of the electron channel unit may be symmetrically arranged about the center portion.

The edges of the electron channel unit may include two edges arranged at opposite sides about the center portion.

The edges of the electron channel unit may include four edges arranged perpendicularly about the center portion.

BRIEF DESCRIPTION OF THE DRAWINGS

These and/or other features and aspects of the present invention will become apparent and more readily appreciated by those of ordinary skill in the art from the following description of some exemplary embodiments, taken in conjunction with the accompanying drawings of which:

FIGS. 8A through 8E are schematic cross-sectional views of electron channel units of electrochemical storage cells according to other embodiments of the present invention;

FIGS. 9A through 9E are schematic cross-sectional views of electron channel units of electrochemical storage cells according to other embodiments of the present invention.

DETAILED DESCRIPTION

The invention now will be described more fully hereinafter with reference to the accompanying drawings, in which some illustrative exemplary embodiments of the invention are shown. Embodiments of the present invention may, however, be embodied in many different forms and should not be construed as limited to the embodiments set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. The terminology used herein is for the purpose of describing particular embodiments only and is not intended to be limiting of the invention. For example, as used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Also, it is to be understood that, although the terms "first," "second," "third," etc., may be used herein to describe various elements, components, regions, layers and/or sections, these elements, components, regions, layers, and/or sections should not be limited by these terms. These terms are only used to distinguish one element, component, region, layer, or section from another.

Figure 1:
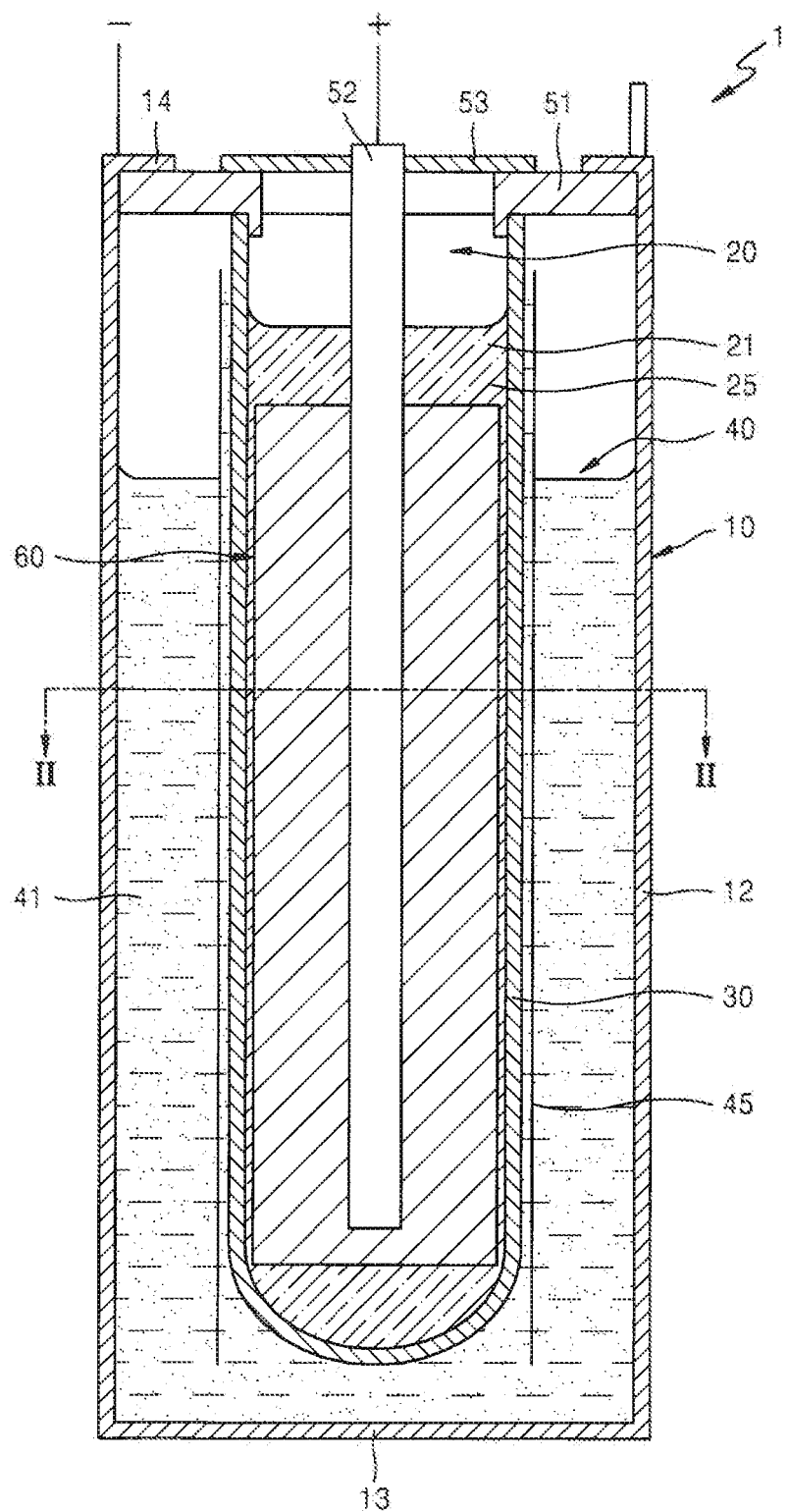
FIG. 1 is a cross-sectional view of an electrochemical storage cell according to an embodiment of the present invention.
Figure 2:
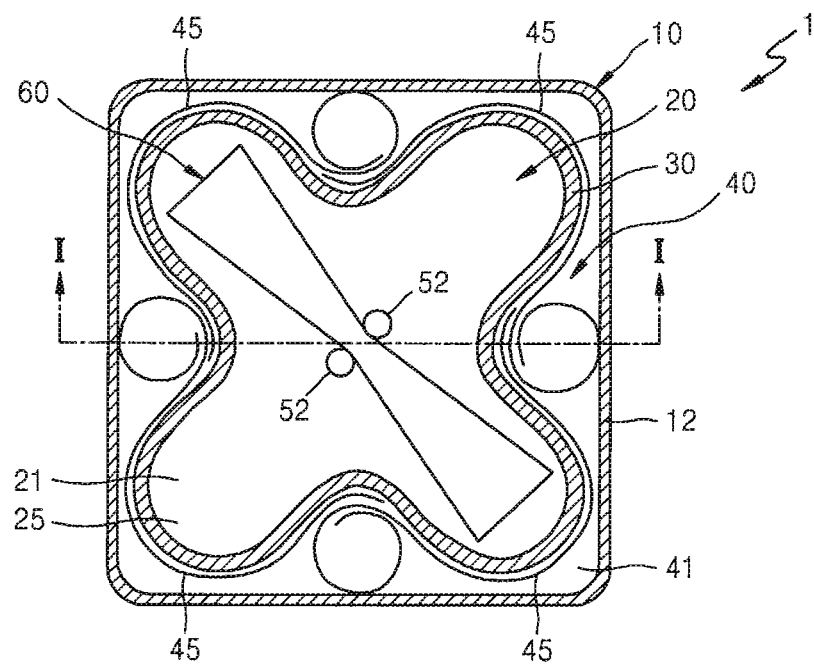
FIG. 2 is a cross-sectional view of the electrochemical storage cell of FIG. 1, taken along the line II-II.

FIG. 1 is a sectional view of an electrochemical storage cell according to an embodiment of the present invention, and FIG. 2 is a cross-sectional view of the same. FIG. 1 is a sectional view taken along the line I-I of FIG. 2, whereas FIG. 2 is a cross-sectional view taken along the line II-II of FIG. 1.

Referring to FIGS. 1 and 2, an electrochemical storage cell 1 according to an embodiment of the present invention includes a housing 10 and a solid electrolyte tube 30 which defines the inside of the housing 10 as two electrode chambers. A first electrode chamber defined by the solid electrolyte tube 30 functions as a negative electrode chamber 40, whereas a second electrode chamber functions as a positive electrode chamber 20.

The housing 10, in one embodiment, may have a generally hexahedral shape having a generally rectangular horizontal cross-section and extending in a vertical direction. The housing 10 includes sidewalls 12 extending in the vertical direction and a lower wall 13 substantially perpendicular (e.g., bent to be substantially perpendicular) with respect to the sidewalls 12. An upper wall 14 of the housing 10, in one embodiment, is partially open, such that a current collector 52 extending from the positive electrode chamber 20 is exposed to the outside. In other embodiments, the cross-sectional shape of the housing 10 may be other than a rectangular shape, such as any of various shapes including a polygonal shape, a circular shape, etc., and may be formed in any of various sizes. The housing 10 may be formed of a metal, such as nickel or mild steel. The housing 10, in one embodiment, functions as a negative electrode current collector.

The solid electrolyte tube 30 is housed in the housing 10 and defines the internal space of the housing 10 as two spaces including the first electrode chamber and the second electrode chamber, which is formed inside the first electrode chamber. The solid electrolyte tube 30 is a tube extending in a lengthwise direction (e.g., a vertical direction) of the housing 10 and having an open top, and the bottom surface of the solid electrolyte tube 30 is arranged to be spaced apart by a predetermined distance from a bottom inner surface of the housing 10. The first electrode chamber is formed outside the solid electrolyte tube 30, that is, between the housing 10 and the solid electrolyte tube 30, and may be used as the negative electrode chamber 40. The second electrode chamber is formed inside the solid electrolyte tube 30 and may be used as the positive electrode chamber 20.

The negative electrode chamber 40 includes a negative electrode material 41. The negative electrode material 41 may be an alkali metal, such as sodium (Na), and may be in a melted state as a liquid. Alternatively, the negative electrode material 41 may be another alkali metal, such as lithium or potassium, or a mixture of sodium and another alkali metal.

The positive electrode chamber 20 includes a positive electrode material 21 and a liquid electrolyte 25. The positive electrode material 21 may have electrical conductivity and porosity and may hold the liquid electrolyte 25 therein. The positive electrode material 21 may be formed of a transition metal, such as nickel, cobalt, zinc, chrome, iron, etc. In a charged state, the positive electrode material 21 forms $TCl_2$. Here, the Cl indicates chloride of the electrolyte, and T indicates a transition metal.

Sodium tetrachloro aluminate ($NaAlCl_4$) may be used as the liquid electrolyte 25. The $NaAlCl_4$ may be a compound of sodium chloride (NaCl) and aluminum chloride ($AlCl_3$) that are substantially equimolar. The liquid electrolyte 25 is in a melted state as a liquid at the operating temperature of the electrochemical storage cell 1.

The current collector 52, in one embodiment, extends in the vertical direction inside the positive electrode chamber 20, and an end of the current collector 52 is exposed to the outside of the electrochemical storage cell 1. The current collector 52 may include a metal, such as nickel. The current collector 52, in one embodiment, includes two poles, and an electron channel unit 60 may be fixed between the two poles. A disk unit 53, in one embodiment, is integrated with the two poles and partially exposes the current collector 52 to the outside.

The electron channel unit 60 is arranged inside the positive electrode chamber 20 and facilitates movement of electrons in the positive electrode chamber 20. The electron channel unit 60 facilitates movement of electrons generated during charging or discharging in a direction from the solid electrolyte tube 30 toward the current collector 52 (i.e. the anode electrode) or in a direction from the current collector 52 (i.e. the anode electrode) toward the solid electrolyte tube 30.

The electron channel unit 60 may include a carbon-based material. For example, in one embodiment, the electron channel unit 60 may be formed of a carbon felt. The carbon felt is porous and may hold the liquid electrolyte 25 therein. A shape, material, and function of the electron channel unit 60 will be described below in further detail with reference to FIGS. 2 through 9E.

The solid electrolyte tube 30 has sodium ion conductivity. The solid electrolyte tube 30 may be formed of β-alumina, β"-alumina, or a compound thereof, which exhibits fast conductivity with respect to sodium ions. Alternatively, the solid electrolyte tube 30 may be formed of zeolite, feldspar, or a sodium ion-conducting glass.

An insulation ring 51, in one embodiment, interconnects the top of the solid electrolyte tube 30 and the top of the housing 10 and seals the negative electrode chamber 40. The insulation ring 51 is arranged between the solid electrolyte tube 30 and the housing 10 and may be welded to the solid electrolyte tube 30 via an adhesive, such as glass frit. The insulation ring 51 may be formed of α-alumina, for example.

A plurality of wicks 45 may be arranged on an outer surface of the solid electrolyte tube 30. The wicks 45 may be disposed between and may contact the outer surface of the solid electrolyte tube 30 and an inner surface of the housing 10, so as to support the solid electrolyte 30 tube.

The wicks 45 may allow a working fluid, such as Na, to move due to a capillary tube phenomenon. Therefore, even if the negative electrode chamber 40 is not completely filled with the negative electrode material 41 (e.g., sodium), the negative electrode material 41 may directly contact the outer surface of the solid electrolyte tube 30 and may be involved in reactions based on charging and discharging.

The electrochemical storage cell 1 having the configuration as described above is a secondary battery that may be charged and discharged. Reactions during charging and discharging will be described below. It is assumed for purposes of the description below that the negative electrode material 41 involved in the charging and discharging is sodium, the positive electrode material 21 is nickel, the liquid electrolyte 25 is sodium tetrachloro aluminate, and the solid electrolyte tube 30 is β-alumina.

In the discharge operation of the electrochemical storage cell 1, a reaction (1) as shown below occurs in the negative electrode chamber 40.

$$Na \rightarrow Na^+ + e^- \tag{1}$$

Sodium ions generated by the reaction (1) move to the positive electrode chamber 20 via the solid electrolyte tube 30 and become involved in a reaction (2) as shown below. Meanwhile, electrons generated by the reaction (1) move to an external circuit (not shown) via the housing 10.

Meanwhile, due to the applied potential, electrons move from the external circuit to the current collector 52 of the positive electrode chamber 20. Reactions (2) and (3) as shown below occur in the positive electrode chamber 20.

$$Na^+ + Cl^- \rightarrow NaCl \tag{2}$$

$$NiCl_2 + 2e^- \rightarrow Ni + 2Cl^- \tag{3}$$

As the reactions (2) and (3) progress, a nickel channel is formed between the current collector 52 and the solid electrolyte tube 30. Electrons, which have moved from the external circuit to the current collector 52, move toward the solid electrolyte tube 30 via the nickel channel. At this point, the electron channel unit 60 according to an embodiment of the present invention may shorten a path in which the electrons move.

In the charge operation of the electrochemical storage cell 1, a reaction which is the reverse of the reaction in the discharge operation occurs. Reactions (4) and (5) as shown below occur in the positive electrode chamber 20.

$$NaCl \rightarrow Na^+ + Cl^- \tag{4}$$

$$Ni + 2Cl^- \rightarrow NiCl_2 + 2e^- \tag{5}$$

Referring to the reaction (4), NaCl in the positive electrode chamber 20 is decomposed by a potential applied thereto, and sodium ions and chlorine ions are formed. Referring to the reaction (5), chlorine ions react with nickel in the positive electrode chamber 20 to form nickel chloride, where electrons formed at the same time are supplied to an external circuit. Meanwhile, sodium ions generated in the reaction (4) may move to the negative electrode chamber 40 via the solid electrolyte tube 30 due to the applied potential.

In the negative electrode chamber 40, sodium ions are combined with electrons moved from the external circuit in reaction (6) below.

$$Na^+ + e^- \rightarrow Na \tag{6}$$

The charging and discharging process described above may be briefly expressed as reaction (7) below.

$$2NaCl + Ni \underset{Discharging}{\overset{Charging}{\rightleftharpoons}} NiCl_2 + 2Na \tag{7}$$

Referring to FIG. 2, the electron channel unit 60 is formed to have a non-constant thickness, such as a thickness that changes in a direction from the center of the electron channel unit 60 to edges of the electron channel unit 60. In one embodiment, the thickness of the electron channel unit 60 increases in a direction from the center of the electron channel unit 60 to the edges of the electron channel unit 60. Since, in one embodiment, the edges of the electron channel unit 60 have a relatively large thickness, a distance between the edges of the electron channel unit 60 and the solid electrolyte tube 30 is relatively small as compared to a distance between the center of the electron channel unit 60 and the solid electrolyte tube 30. A portion of the electron channel unit 60 at or near the center of the electron channel unit 60 may be supported by the current collector 52.

During discharging of the electrochemical storage cell 1, a reaction in the positive electrode chamber 20 is initiated at a portion close to the solid electrolyte tube 30 and spreads toward the center portion of the positive electrode chamber 20. At this point, electrons moved from an external circuit to the current collector 52 may move through the electron channel unit 60, which may contain a carbon-based material having a relatively high electron mobility, to be involved in the reaction. The electrons moved through the electron channel unit 60 reach an edge of the electron channel unit 60, and, since a distance between the edge of the electron channel unit 60 and the solid electrolyte tube 30 is relatively short, the electrons may be quickly involved in the reaction (3) which is initiated at a portion close to the solid electrolyte tube 30. In other words, the electron channel unit 60 enables stable movement of electrons and shortens a path in which electrons move.

During charging of the electrochemical storage cell 1, a reaction in the positive electrode chamber 20 is initiated at the center portion of the positive electrode chamber 20 and spreads toward a portion close to the solid electrolyte tube 30.

Electrons generated by a reaction occurring in the positive electrode chamber 20 during charging of the electrochemical storage cell 1 move to the current collector 52 via the electron channel unit 60, and then move to an external circuit connected to the current collector 52. In one embodiment, the thickness of the electron channel unit 60 increases in a direction from the center of the electron channel unit 60 to the edges of the electron channel unit 60. Therefore, even electrons generated in the reaction (5) which may occur relatively far from the current collector 52 may also move to the current collector 52 via the electron channel unit 60 without any loss, and thus an overall efficiency of charging the electrochemical storage cell 1 may be improved.

Figure 3:
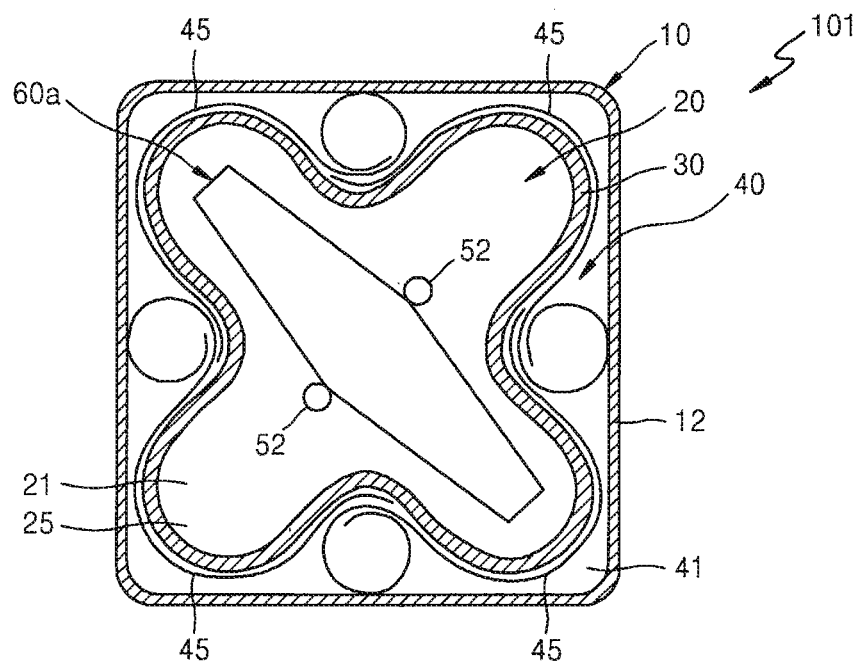
FIGS. 3 and 4 are cross-sectional views of electrochemical storage cells according to other embodiments of the present invention.

FIG. 3 is a cross-sectional view of an electrochemical storage cell 101 including an electron channel unit 60a according to another embodiment of the present invention. A cross-sectional shape of the electron channel unit 60a according to the embodiment shown in FIG. 3 differs compared to that of the electron channel unit 60 according to the embodiment shown in FIG. 2.

Referring to FIG. 3, the electron channel unit 60a is formed to have a non-constant thickness, and, in one embodiment, is formed such that the thickness of the electron channel unit 60a decreases in a direction from a center portion of the electron channel unit 60a toward the edges of the electron channel unit 60a.

Since, in one embodiment, the center portion of the electron channel unit 60a has a relatively large thickness, a distance between a portion of the electron channel unit 60a close to the center of the electron channel unit 60a and the solid electrolyte tube 30 is relatively short as compared to a distance between the edges of the electron channel unit 60a and the solid electrolyte tube 30.

During discharging of the electrochemical storage cell 101, a reaction in the positive electrode chamber 20 is initiated at a portion close to the solid electrolyte tube 30 and spreads toward the center portion of the positive electrode chamber 20. In this case, electrons moved from an external circuit to the current collector 52 may move in the electron channel unit 60a to be involved in the reaction. Since the electron channel unit 60a according to one embodiment is formed to have a relatively thick center portion, a distance between a portion of the electron channel unit 60a close to the center of the electron channel unit 60a and the solid electrolyte tube 30 is relatively small. Compared to other paths, the electrons may be quickly involved in a reaction via this path.

Meanwhile, the same reaction as described above with reference to the embodiment shown in FIG. 2 occurs during charging of the electrochemical storage cell 101. Since a surface area of the electron channel unit 60a is significantly larger than an electron channel unit having a constant thickness, electrons may move to an external circuit via the current collector 52 without any loss.

Figure 4:
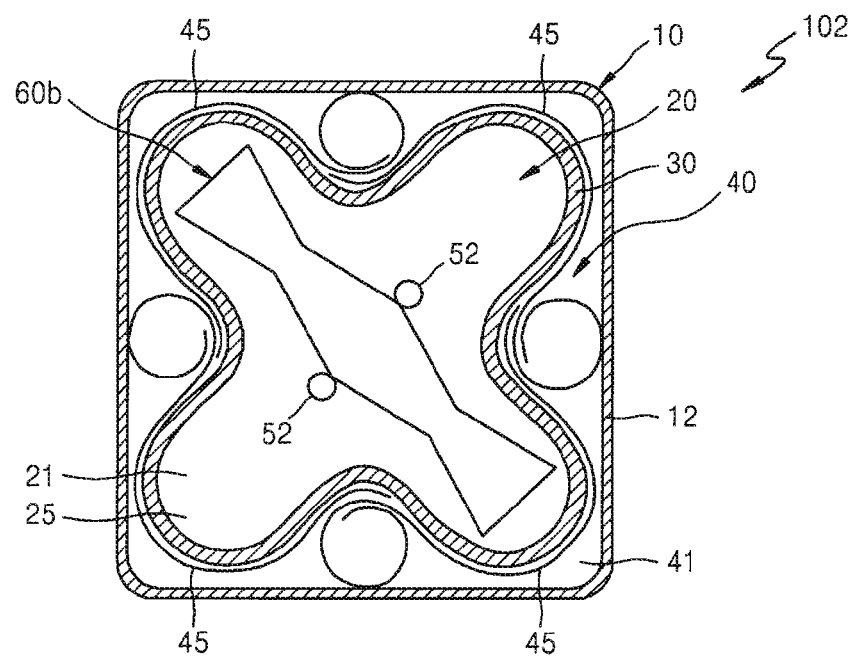

FIG. 4 is a cross-sectional view of an electrochemical storage cell 102 including an electron channel unit 60b according to another embodiment of the present invention.

Referring to FIG. 4, both a center portion and edges of the electron channel unit 60b are formed to have relatively large thicknesses. In other words, since the center portion and the edges of the electron channel unit 60b are formed to have relatively larger thicknesses, a plurality of sections spaced apart from the solid electrolyte tube 30 by relatively short distances are formed during discharging of the electrochemical storage cell 102, and thus the overall efficiency of discharging the electrochemical storage cell 102 may be improved. Further, since a surface area of the electron channel unit 60b is further increased due to the shape thereof, as shown in FIG. 4, electrons generated by the positive electrode chamber 20 during charging of the electrochemical storage cell 102 may be moved to the current collector 52 without any loss.

Figures 5A, 5B, 5C:
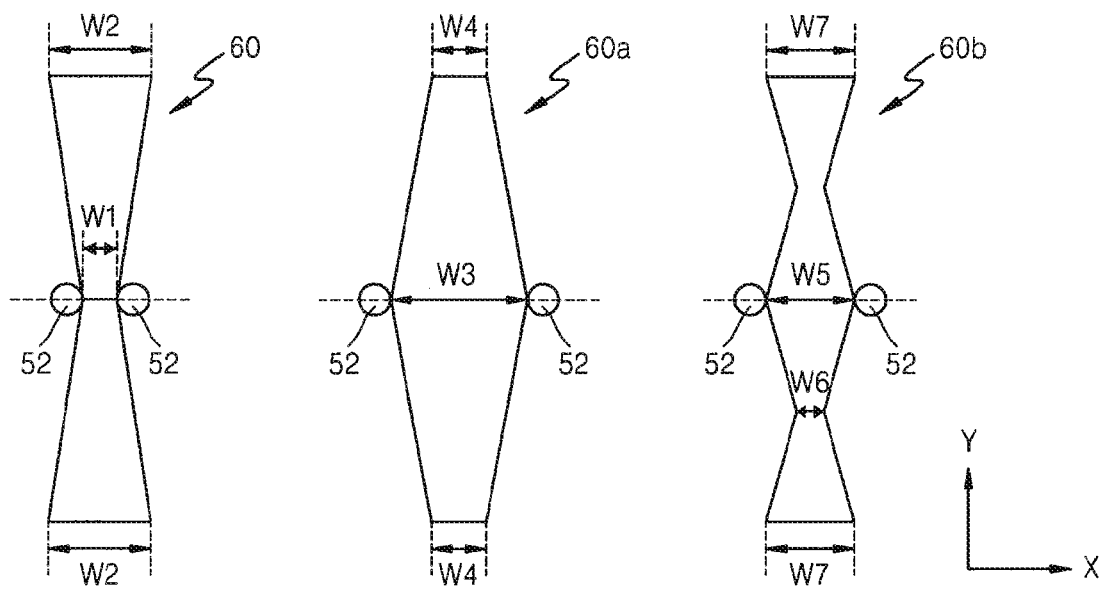
FIGS. 5A through 5C are schematic cross-sectional views of electron channel units of the electrochemical storage cells of FIGS. 2 through 4, respectively.

FIGS. 5A through 5C are schematic cross-sectional views of the electron channel units 60, 60a, and 60b according to the embodiments shown in FIGS. 2, 3, and 4, respectively.

Referring to FIG. 5A, a greatest thickness W2 of the electron channel unit 60 at edges thereof may be less than twice a smallest thickness W1 of the electron channel unit 60 at a center portion thereof. In other words, the electron channel unit 60 may be formed such that W1<W2<2W1. Referring to FIGS. 2 through 4, the cross-sectional shape of the solid electrolyte tube 30 is a clover-like shape having four edges, and the thicknesses W1 and W2 of the electron channel unit 60 may be selected in consideration of a thickness of each of the four edges and volumes of the positive electrode material 21 and the liquid electrolyte 25. Particularly, the thickness W2 of the thickest portion of the electron channel unit 60 may be determined in consideration of a thickness of an end of the clover-like-shaped solid electrolyte tube 30.

Referring to FIG. 5B, a greatest thickness W3 of the electron channel unit 60a is the thickness of the center portion of the electron channel unit 60a, whereas a smallest thickness W4 of the electron channel unit 60a is the thickness of edges of the electron channel unit 60a. In one embodiment, the greatest thickness W3 of the electron channel unit 60a may be less than twice the smallest thickness W4 of the electron channel unit 60a.

Referring to FIG. 5C, the greatest thickness of the electron channel unit 60b may be a thickness W5 of the center portion of the electron channel unit 60b and/or a thickness W7 of edges of the electron channel unit 60b. The thicknesses W5 and W7 of the electron channel unit 60b may be less than twice a smallest thickness W6 of the electron channel unit 60b. The smallest thickness W6 may be a thickness of any portion of the electron channel unit 60b that is located between portions having the thicknesses W5 and W7.

In embodiments of the present invention, the electron channel unit 60, 60a, 60b (and additional embodiments of an electron channel unit described below) may be symmetrical about an axis extending through the center of the electron channel unit 60, 60a, 60b. For example, the electron channel unit 60, 60a, 60b may be symmetrical (e.g., vertically symmetrical) about an axis parallel to the X-axis and/or symmetrical (e.g., horizontally symmetrical) about an axis parallel to the Y-axis. Due to a symmetrical shape, reactions occurring during charging and discharging of the electrochemical storage cell 1, 101, 102 may occur symmetrically and uniformly.

Figure 6A:
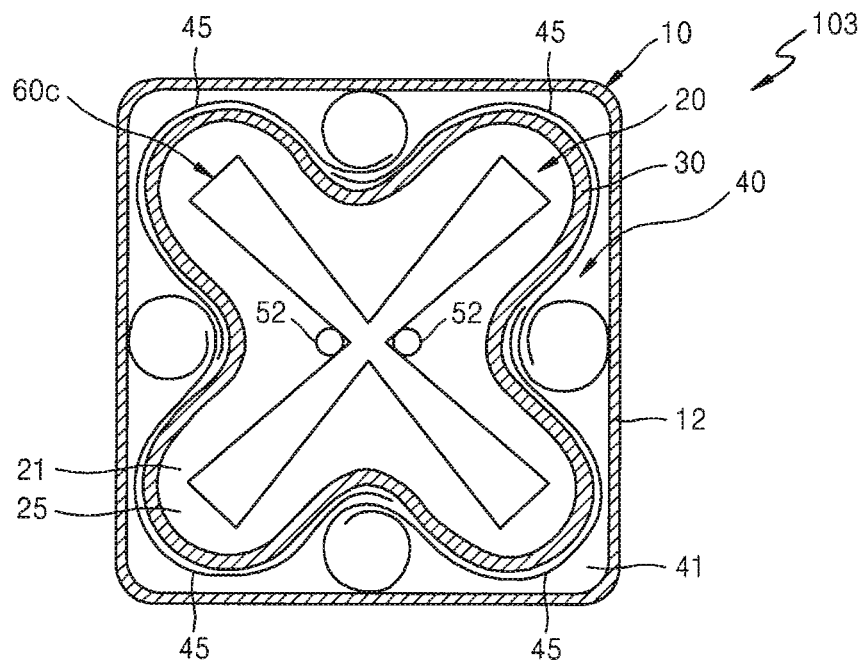
FIGS. 6A and 6B are cross-sectional views of electrochemical storage cells according to other embodiments of the present invention.
Figure 6B:
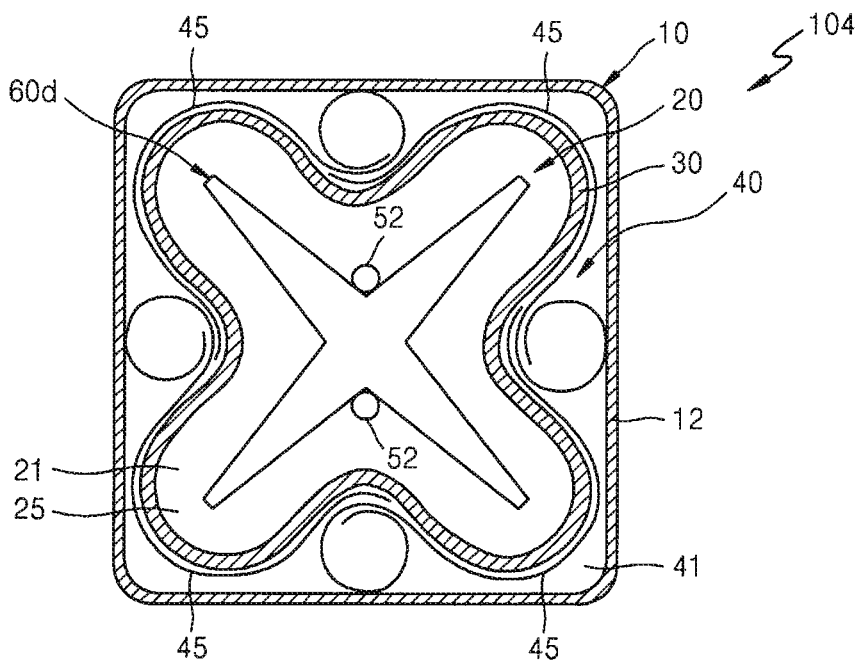
Figure 7A:
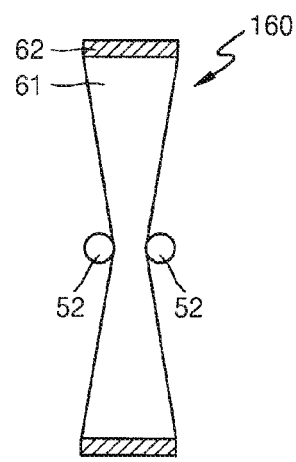
FIGS. 7A through 7E are schematic cross-sectional views of electron channel units of electrochemical storage cells according to other embodiments of the present invention.
Figure 7B:
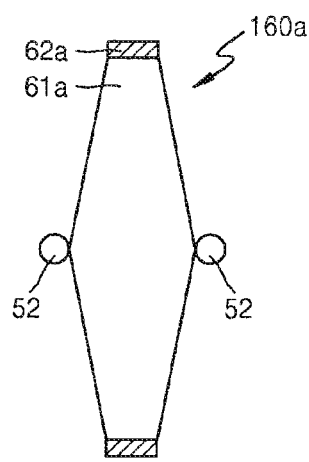
Figure 7C:
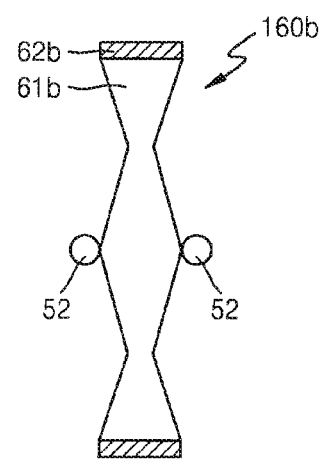
Figure 7D:
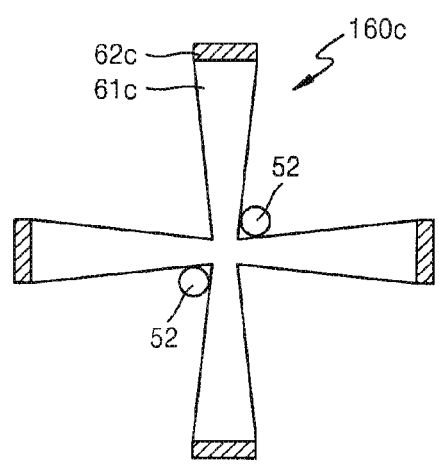
Figure 7E:
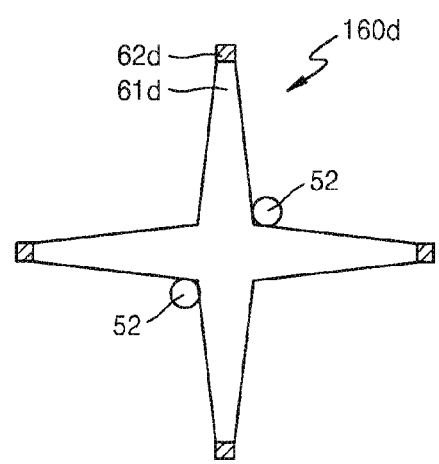

FIGS. 6A and 6B are cross-sectional views of electrochemical storage cells 103 and 104 including electron channel units 60c and 60d, respectively, according to other embodiments of the present invention.

Referring to FIGS. 6A and 6B, cross-sectional shapes of the electron channel units 60c and 60d may be cross-like shapes. While the electron channel units 60, 60a, 60b described above with reference to FIGS. 2 through 5C have two edges arranged at an angle of about 180° therebetween, the electron channel units 60c and 60d, as shown in FIGS. 6A and 6B, have four edges arranged at angles of about 90° therebetween. Due to the cross-like shape extending in four directions, uniform reactions may occur at edges of the clover-like-shaped solid electrolyte tube 30 having four edges. In one embodiment, thicknesses of the electron channel unit 60c may increase from a center portion of the electron channel unit 60c to the edges of the electron channel unit 60c (see FIG. 6A). In another embodiment, thicknesses of the electron channel unit 60d may decrease from a center portion of the electron channel unit 60d to the edges of the electron channel unit 60d (see FIG. 6B). Movements of electrons in each case are as described above with reference to FIGS. 2 and 3.

Further, although not shown, according to another embodiment of the present invention, a cross-sectional shape of an electron channel unit may be a cross-like shape, and thicknesses of the electron channel unit may both decrease and increase along a direction from a center of the electron channel unit toward edges of the electron channel unit.

FIGS. 7A through 8E are cross-sectional views of electron channel units 160, 160a, 160b, 160c, 160d, 160', 160a', 160b', 160c', 160d', respectively, of an electrochemical storage cell according to other embodiments of the present invention.

Referring to FIGS. 7A through 8E, edges of the electron channel units 160, 160a, 160b, 160c, 160d, 160', 160a', 160b', 160c', 160d' may include a metal 62, 62a, 62b, 62c, 62d, 62', 62a', 62b', 62c', 62d'. For example, the electron channel unit 160, 160a, 160b, 160c, 160d, 160', 160a', 160b', 160c', 160d' may be formed by combining a metal, such as silver (Ag), to a carbon felt 61, 61a, 61b, 61c, 61d, of which a thickness increases or decreases in a direction from a center portion of the carbon felt 61, 61a, 61b, 61c, 61d to edges of the carbon felt 61, 61a, 61b, 61c, 61d. Silver (Ag) is a material having higher electrical conductivity than carbon (C), and thus silver may facilitate the movement of electrons. Alternatively, any metal including copper, gold, aluminum, magnesium, zinc, iron, etc. may be used. A graphite felt may also be used instead of the carbon felt 61, 61a, 61b, 61c, 61d.

In one embodiment, the metal 62, 62a, 62b, 62c, 62d combined with the edges of the electron channel unit 160, 160a, 160b, 160c, 160d may be formed to have a constant thickness, regardless of a change in thickness of the carbon felt 61, 61a, 61b, 61c, 61d (refer to FIGS. 7A through 7E). In another embodiment, the metal 62', 62a', 62b', 62c', 62d' combined with the edges of the electron channel unit 160', 160a', 160b', 160c', 160d' may be formed to have a thickness increasing or decreasing according to a change of thickness of the carbon felt 61, 61a, 61b, 61c, 61d (refer to FIGS. 8A through 8E).

FIGS. 9A through 9E are cross-sectional views of electron channel units 260, 260a, 260b, 260c, and 260d, respectively, of an electrochemical storage cell according to other embodiments of the present invention.

Referring to FIGS. 9A through 9E, the electron channel units 260, 260a, 260b, 260c, and 260d may include a carbon felt and a metal layer 63, 63a, 63b, 63c, 63d coated around the carbon felt. For example, the metal layer 63, 63a, 63b, 63c, 63d may be formed by coating a metal to surround the carbon felt, of which thickness increases or decreases in a direction from the center portion of the carbon felt to the edges of the carbon felt. The metal layer 63, 63a, 63b, 63c, 63d may include a material with high electrical conductivity, such as silver, copper, gold, aluminum, magnesium, zinc, iron, etc.

Figure 10:
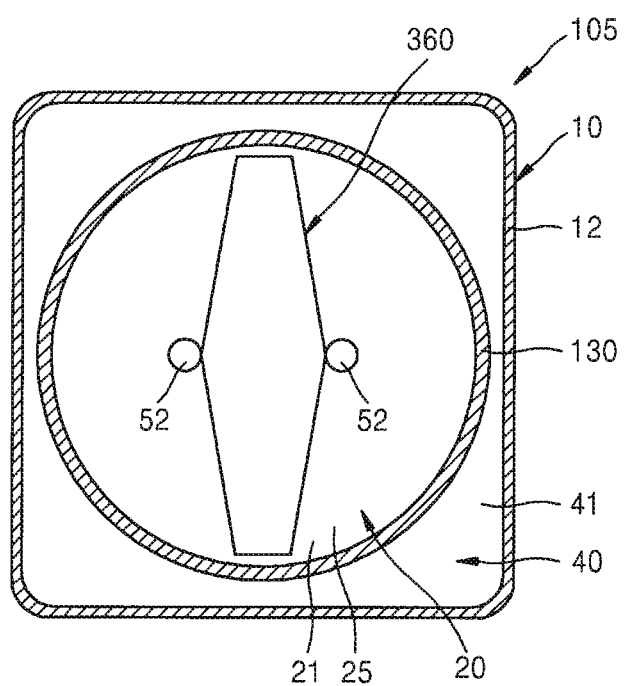
FIG. 10 is a cross-sectional view of an electrochemical storage cell according to another embodiment of the present invention.

FIG. 10 is a cross-sectional view of an electrochemical storage cell 105 according to another embodiment of the present invention.

Referring to FIG. 10, the electrochemical storage cell 105 according to one embodiment includes the housing 10, a solid electrolyte tube 130 which defines the inside of the housing 10 as the negative electrode chamber 40 and the positive electrode chamber 20, the negative electrode material 41, the positive electrode material 21, and the liquid electrolyte 25, which may be as described above with respect to the electrochemical storage cell 1 with reference to FIGS. 1 and 2. However, the solid electrolyte tube 130 according to the present embodiment may be longer in the vertical direction and the cross-sectional shape of the solid electrolyte tube 130 is circular. In one embodiment, the cross-sectional shape of the solid electrolyte tube 130 is circular, and the electron channel unit 60 may be as described above with reference to FIGS. 2 through 9 and arranged within the positive electrode chamber 20. According to another embodiment of the present invention (not shown), a cross-sectional shape of a solid electrolyte tube, rather than being clover-like-shaped or circular, may be of any of various shapes including polygonal shapes, elliptical shapes, etc.

Some exemplary embodiments have been disclosed herein, and although specific terms are employed, they are used and are to be interpreted in a generic and descriptive sense only and not for purpose of limitation. Descriptions of features or aspects within each embodiment should typically be considered as available for other similar features or aspects in other embodiments. Accordingly, it will be understood by those of ordinary skill in the art that various changes in form and details may be made without departing from the spirit and scope of the present disclosure as set forth in the following claims.

What is claimed is:

1. An electrochemical storage cell comprising:
   a housing;
   a solid electrolyte tube, which defines an inner space of the housing as a first electrode chamber and a second electrode chamber;
   a first electrode material in the first electrode chamber;
   a second electrode material in the second electrode chamber;
   an electron channel unit formed of a porous carbon-based felt and arranged in the second electrode chamber for guiding movement of electrons in the second electrode chamber, the electron channel unit comprising a center portion and a first edge and a second edge at opposite sides of the center portion, the porous carbon-base felt having a thickness that decreases from the center portion of the electron channel unit toward the first edge of the electron channel unit; and
   a metal current collector adjacent to the porous carbon-based felt and exposed to an outside of the housing,
   wherein a shortest distance between the solid electrolyte tube and a portion of the porous carbon-based felt that is between the center portion and the first edge is less than a shortest distance between the solid electrolyte tube and the first edge.

2. The electrochemical storage cell of claim 1, wherein the thickness of the porous carbon-based felt is greater at the center portion of the electron channel unit than at each of the first edge and the second edge of the electron channel unit.

3. The electrochemical storage cell of claim 2, wherein the thickness of the porous carbon-based felt gradually decreases from the center portion toward each of the first edge and the second edge.

4. The electrochemical storage cell of claim 1, wherein the thickness of the porous carbon-based felt at a thickest portion of the electron channel unit is less than twice the thickness of the porous carbon-based felt at a thinnest portion of the electron channel unit.

5. The electrochemical storage cell of claim 1, wherein the electron channel unit is symmetrical about an axis extending through a center of the electron channel unit.

6. The electrochemical storage cell of claim 1, wherein the electron channel unit comprises a metal.

7. The electrochemical storage cell of claim 6,
wherein the thickness of the porous carbon-based felt is non-constant from the center portion of the electron channel unit toward each of the first edge and the second edge of the electron channel unit; and
wherein the electron channel unit comprises a metal layer arranged on an outer surface of the carbon-based felt.

8. The electrochemical storage cell of claim 6,
wherein the thickness of the porous carbon-based felt is non-constant from the center portion of the electron channel unit toward each of the first edge and the second edge of the electron channel unit; and
wherein the electron channel unit comprises a metal member combined with edges of the carbon-based felt.

9. The electrochemical storage cell of claim 1, wherein a cross-sectional shape of the electron channel unit comprises a cross shape or a linear shape.

\* \* \* \* \*